July 6, 1965 G. R. COGAR ETAL 3,193,697

SYNCHRONIZED SINGLE PULSER

Filed Nov. 6, 1962 3 Sheets-Sheet 1

INVENTORS
GEORGE R. COGAR
TORKJELL SEKSE

BY J. Donald Weber, Jr.
AGENT

July 6, 1965 G. R. COGAR ETAL 3,193,697

SYNCHRONIZED SINGLE PULSER

Filed Nov. 6, 1962 3 Sheets-Sheet 2

July 6, 1965 G. R. COGAR ETAL 3,193,697

SYNCHRONIZED SINGLE PULSER

Filed Nov. 6, 1962 3 Sheets-Sheet 3

3,193,697

SYNCHRONIZED SINGLE PULSER

George R. Cogar, Doylestown, and Torkjell Sekse, Norristown, Pa., assignors to Sperry Rand Corporation, New York, N.Y., a corporation of Delaware Filed Nov. 6, 1962, Ser. No. 235,754
13 Claims. (Cl. 307—88.5)

This invention relates to a circuit which permits the production of a single synchronized output pulse in response to a non-synchronous input pulse. The synchronized output pulse may be synchronized with some phase of operation of associated circuitry.

In electronic computers, especially those of the digital type, as well as other devices having timing requirements, a problem often arises with regard to the synchronization of pulses within different circuits in the device. That is, when information is to be introduced into the computing machine by a human operator for example, asynchronous pulses or other non-synchronized pulses, are often introduced into the computer circuitry during the transitional state which exists between steady state operating conditions. These asynchronously introduced pulses must be so manipulated that information represented thereby can be properly utilized by other portions of the computer circuitry which are synchronized with each other. In other words, the operator may, and usually does, operate much more slowly than does the machine. Therefore it is desirable to have a circuit which will allow the production of only a single output pulse in response to one input signal, regardless of its excessive length relative to the cyclic operating speed of the computing machine. Moreover, it is even more advantageous to have the single output pulse produced in synchronism with the operation of the overall machine as for example, in accordance with a particular clock or phase signal.

In order that this single pulse synchronization may be effected, the subject circuit has been devised. Clearly, one object of this invention is to provide a circuit which provides a synchronized output pulse in response to a non-synchronous input signal.

Another object of this invention is to produce a single synchronized output signal having a duration which corresponds to the duration of a predetermined control signal.

Another object of this invention is to provide a circuit which produces a single standardized output pulse from a non-synchronous input signal regardless of the excessive length of the input signal.

Another object of the invention is to provide a circuit configuration which is capable of converting an asynchronous input signal of any duration to a single pulse which is synchronized with a control pulse.

Another object of this invention is to provide a synchronizing circuit utilizing standard logic components.

Another further object of the invention is to provide a synchronizing circuit which avoids the reproduction of improper spurious input signals.

Another object of the invention is to provide a circuit which will produce an output only when switched back to a set condition from a reset condition but will not produce an output when initially switched to the reset condition.

These and other objects and advantages of the invention will become more readily apparent by reviewing the following description in conjunction with the attached figures, in which.

Figure 1:
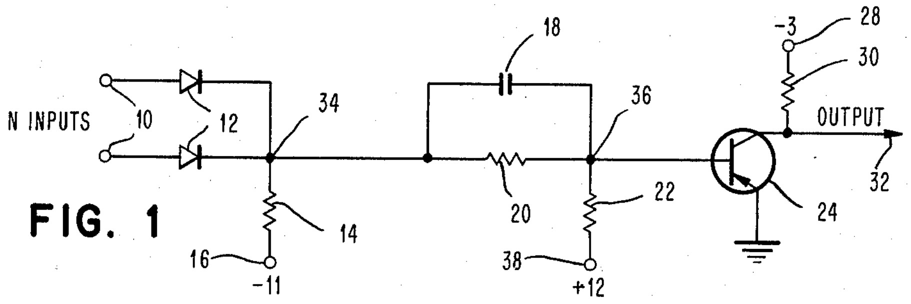
FIGURE 1 is a schematic diagram of the circuit utilized in each of the gates shown in the subsequent figures.
Figure 2:
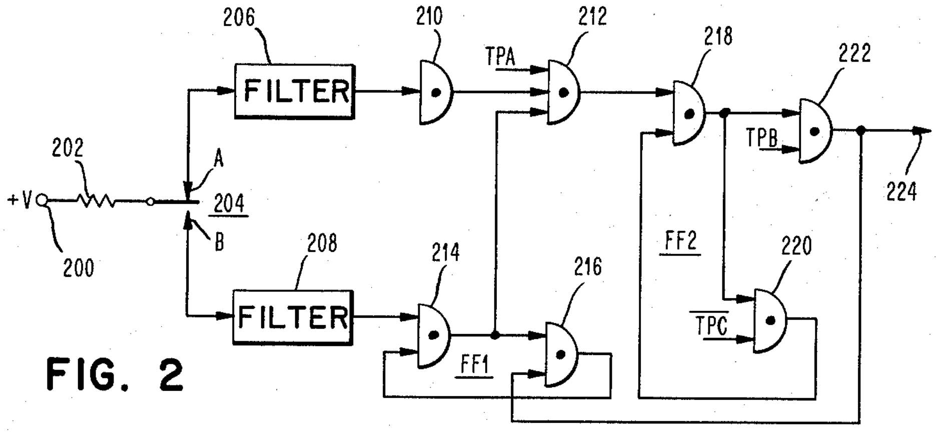
FIGURE 2 is a logical block diagram of one embodiment of the instant invention.
Figure 4:
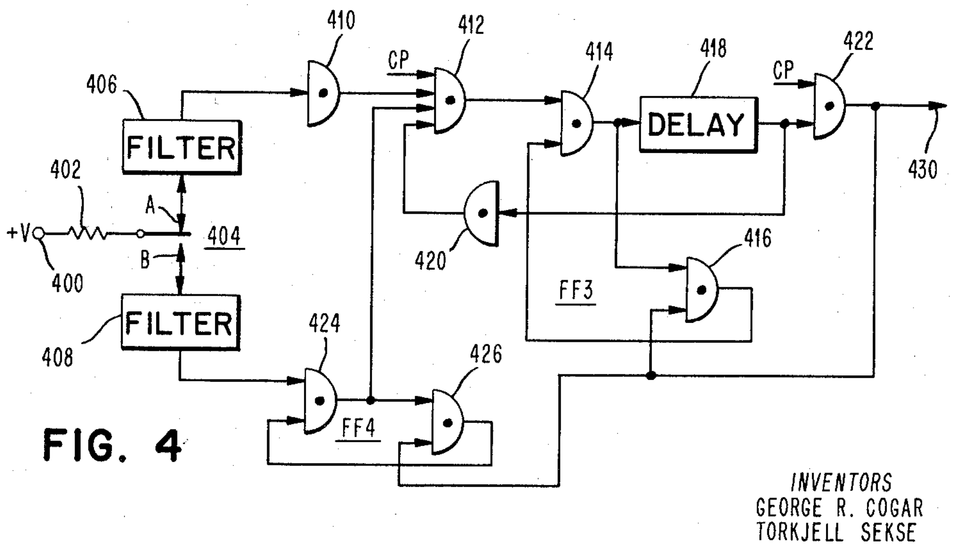
FIGURE 4 is a logical block diagram of a second embodiment of the instant invention.

Referring now to FIGURE 1, there is shown a schematic diagram of the circuit which is utilized in each of the gates shown in the circuit embodiments shown in FIGURES 2 and 4. Each of the gate circuits shown in these latter figures is identical except for the number of inputs applied thereto. In the gating circuit in FIGURE 1, input signals are supplied by the N inputs. Only two input terminals are shown, but the gate circuit is not to be so limited. That is, the N inputs may be any number of inputs which may be adequately handled by the remainder of the circuit. The inputs are applied to the anodes of the isolating input diodes 12. The cathodes of these diodes are all connected to a common junction 34. The isolating input diodes serve to isolate the remainder of the circuit from the input circuitry. Furthermore, the input diodes 12 because of their inherent unilateral conducting properties may be utilized to distinguish between high and low level input signals which are defined subsequently. Common junction 34 (the cathodes of the input diodes 12) is connected to one terminal of resistor 14 another terminal of which is connected to a potential source 16. Typically, resistor 14 may be approximately 5,000 ohms while potential source 16 may be any conventional source capable of supplying substantially D.C. potential on the order of —11 volts with respect to ground potential, as are all suggested potential values. Also connected to common junction 34, is one side of speed-up capacitor 18 which may be on the order of 120 microfarads and one terminal of resistor 20 which may be on the order of 1600 ohms. Resistor 20 is a part of a voltage dividing network comprising previously-noted resistor 14 and subsequently-mentioned resistor 22 while capacitor 18 is utilized to provide speed-up operation of the circuit. The other terminal of capacitor 18 and another terminal of resistor 20 are connected together at common junction 36 to which is connected one terminal of resistor 22 which may be on the order of 27,000 ohms. Another terminal of resistor 22 is connected to the potential source 38 which may be any conventional type of source capable of supplying a substantial D.C. potential of approximately +12 volts. Thus, it may be seen that a voltage dividing network comprising resistors 14, 20 and 22 is provided between potential sources 16 and 38. The common junction 36 is also connected to the base electrode of transistor 24. This transistor may be any typical surface-barrier transistor; for example, a Philco type SB100 which permits extremely fast switching functions and which operates at relatively low voltage ratings. Transistor 24 is shown as a PNP type transistor wherein the emitter electrode is connected to ground potential. In the alternative, the emiter of transistor 24 may be connected to a potential source (not shown) which may be any conventional source capable of supplying a suitable substantially D.C. voltage of, for example, approximately +1.5 volts if different signal levels are desired. The collector electrode of transistor 24, in addition to being connected to the output terminal 32, is connected to one terminal of resistor 30 which may be on the order of 750 ohms. Another terminal of resistor 30 is connected to potential source 28 which may be any conventional source capable of supplying a substantially D.C. potential of approximately —3 volts.

The circuit described supra is a circuit which is found to be sometimes described as a 1–C gate-inverter circuit. Basically, this circuit is designed to provide an output signal (where an output signal is defined as having a high level) only when all of the inputs applied to input terminals 10 comprise low level input signals.

Conversely, the application of any one or more high level input signals at input terminals 10 will produce a low level output signal at output terminal 32. In more detail, if all of the input signals, which signals are defined as being zero potential, or ground, at the high level and —3 volts at the low level, are at the low level the input diodes 12 are reversed biased. The voltage dividing network (comprising resistors 14, 20 and 22) previously discussed provides a potential of approximately —2.9 volts at common junction 34 and a potential of approximately —0.4 volt at the base of transistor 24. Since the base-emitter junction of transistor 24 is now forward biased, collector current will be produced whereby the output potential at the collector will tend to rise toward the potential of the emitter. Thus it will be seen that the high level output signal (as defined) is produced only when all of the input signals are low level or negative-going signals. Therefore, from a logical viewpoint the circuit acts as an inverting AND gate to low level signals. If now it is assumed that any one or more of the input signals applied at terminal 10 is a positive-going signal or high signal, the associated input diode 12 will be forward-biased. Under these conditions, additional current will flow through resistor 14 whereby the voltage divider network will be altered such that the potential at common junction 34 will approach —0.6 volt and the potential at common junction 36 will approach approximately 0 volt or ground potential. Actually, the potential at common junction 36 (the base of transistor 24) will rise to ground potential or slightly above due to the voltage dividing network. In either case the base-emitter diode junction of transistor 34 is biased in the reverse direction, or effectively so, due to forward voltage drop at the junction, and the transistor is cut off. The collector output voltage will then drop to the —3 volts supplied by potential source 28 via resistor 30. Since the output is negative when any one of the inputs becomes relatively positive, the circuit is now acting as a logical inverting OR gate for high signals.

Other circuits are known in the art which will perform similar functions. Typical nomenclature for these circuits are Type 1E, Type 1S, gate inverter circuits, or the like. However, it will be seen that the distinctions between these circuits are generally minor variations in such circuit parameters as the component values whereby more or less power may be obtained, or the insertion of diodes in the voltage dividing network for isolation purposes, or the like. However, the circuit described in FIGURE 1 is merely an illustrative type of gating circuit which may be utilized in the synchronized single pulsing circuits which are shown in FIGURES 2 and 4. Thus, it is to be understood that, though a preferred gating circuit is disclosed, this gating circuit is not, per se, a part of the invention.

Referring now to FIGURE 2 there is shown a block diagram in the form of a logical circuit which provides a single pulse output which is synchronized with a particular pulse time. Each of the gates shown in FIGURE 2 is similar to the gate circuit shown in FIGURE 1. In FIGURE 2, an input terminal 200 which may be indicative of any potential source capable of supplying a predetermined potential value which in this case will be assumed to be a positive potential, is connected to one terminal of resistor 202. Another terminal of resistor 202 is connected to the armature of a single-pole, double-throw switch 204. The potential source 200 and the resistor 202 are not specified as regards the actual parameters thereof inasmuch as the input circuit may be of any form and may supply any desired value of potential or current. Furthermore, the schematically shown single-pole, double-throw switch 204 may, in fact, be a relay or any other conventional type of circuit which provides a switching function between two desired operating conditions. In addition, assuming a switch to be used, the operation thereof upon depression or release is dependent upon the assignment of normally open or normally closed contacts.

The contacts A and B of switch 204 are connected to filters 206 and 208, respectively. The filters may be of any conventional design and are utilized to eliminate noise and other spurious pulses which may be applied to the circuit. However, it is important that the filter be so designed that the recovery time thereof be less than the transfer time required for the armature of switch 204 to move from contact A to contact B, or vice versa. This requirement is important to provide fast rise time in the leading edge of the signals transmitted by the switch and to avoid double transfer of information due to switch actuation during filter time. Thus, the transfer time characteristics of the switch delimits the delay times in the filter circuit. Filter 206 is connected to an input of gate 210. This input corresponds to one of the input diodes 112 as suggested in FIGURE 1. The output of gate 210 (which would be obtained from the collector-electrode of transistor 124 in FIGURE 1) is connected to an input of gate 212. Another input supplied to gate 212 is timing pulse TPA. In addition, another input is applied to gate 212 from gate 214 as will be discussed subsequently. The output of gate 212 is applied to the input of gate 218. Another input to gate 218 is applied by the output of gate 220. Gates 218 and 220 are connected to form a flip-flop circuit. Thus, the output of gate 220 is connected to one input of gate 218 while the output of gate 218 is applied to one input of gate 220. Gate 220 also has another input supplied thereto in the form of timing pulse $\overline{\text{TPC}}$. As noted supra, the output of gate 220 is supplied to an input of gate 218. The output of gate 218, in addition to being supplied to an input of gate 220, is supplied to an input of gate 222. Gate 222 has another input, timing pulse TPB, applied thereto. The output of gate 222 is supplied to output terminal 224 as well as to an input of gate 216. Gate 216 and gate 214 are connected together as a flip-flop whereby the output of gate 216 is applied to an input of gate 214. Another input of gate 214 is connected to previously mentioned filter 208. The output of gate 214, in addition to being connected to previously-mentioned gate 212, is also connected to an input of gate 216 along with the input supplied by the output of gate 222.

Figure 3:
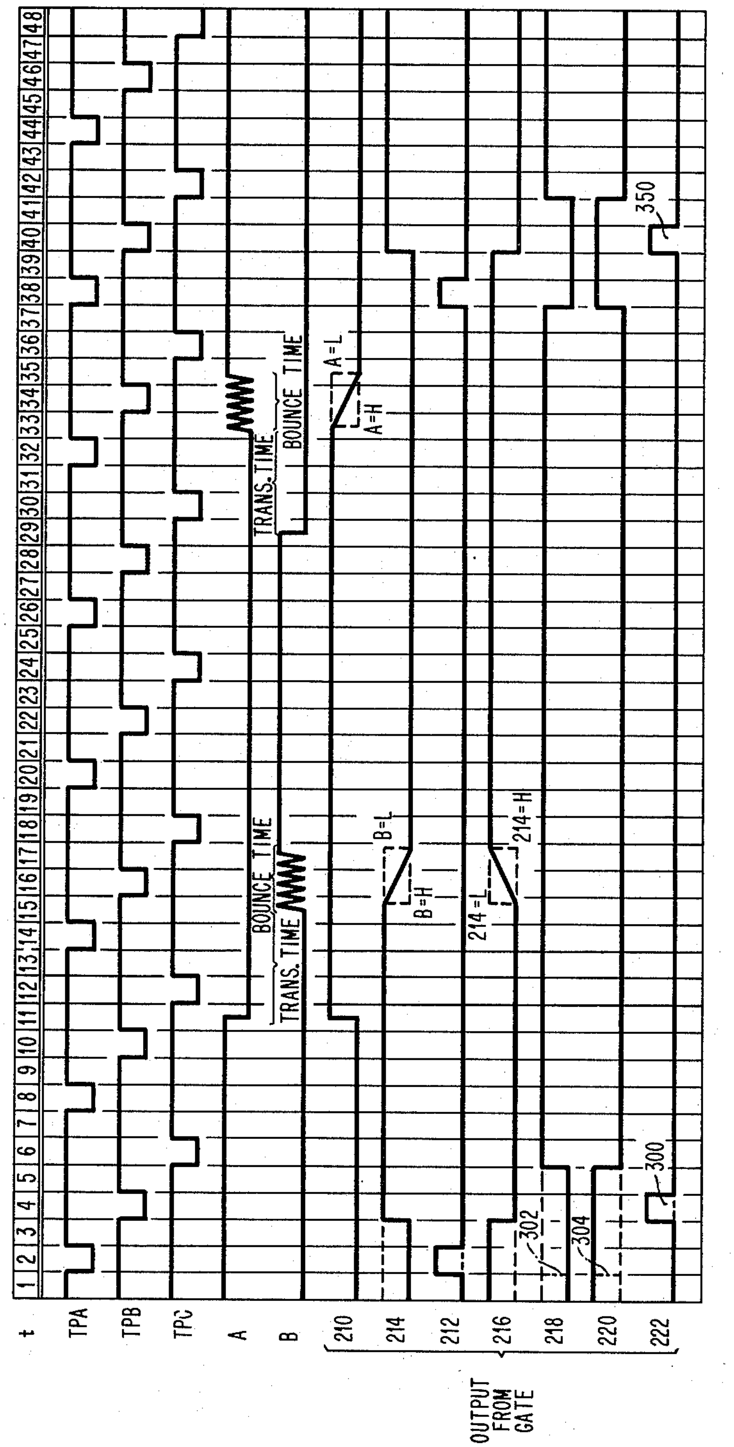
FIGURE 3 is a timing diagram for the circuit embodiment shown in FIGURE 2.

The operation of the circuit shown in FIGURE 2 is most easily understood when considered in conjunction with the timing diagram shown in FIGURE 3. It should be explained that the timing diagram in FIGURE 3 incorporates operating conditions which would apply when the gating circuit was initially turned on wherein certain initial conditions were not controllable, as well as the operating conditions of the circuit when it is considered that the machine which incorporates the circuit has been on for a sufficient length of time that a steady state of operation obtains. That is, since certain of the gates are connected together to form flip-flops, the set or reset condition of these flip-flops is not necessarily predictable initially and preliminary assumptions regarding the operating conditions of the associated gate-pairs or flip-flops must be made. Thereafter, however, the operation of the several gates is specified by the inputs thereto and becomes predictable. Thus, it will be seen that at time period $t1$ the output signals applied by gate 214 may be either a high or a low level signal. Similarly, the same operation applies in the case of gates 216, 218 and 220. As noted each of these gates is associated with a flip-flop circuit, and one or the other of the gates may assume a certain operating condition because of inherent distinctions and differences in the circuit components. Clearly, these differences are noticeable only at the initiation of overall operation and are soon effectively eliminated. The first flop-flop, FF1, comprises gates 214 and 216. With the switch 204 in the condition shown in FIGURE 2, i.e., with the armature thereof adjacent contact A, a low level signal is applied to filter 208 via contact B. Thus, the output of gate 214 could be a high or a low level signal in accordance with the signal which is applied to the other input of gate 214. The other input of gate 214 is the output of gate 216. Since the inputs to gate 216 comprise the output of gate 214 and the output of gate 222 (also the output of the circuit), it is difficult to determine actually what these various signals will be. That is, since the circuit is initially being turned on at time period $t1$, the output signals produced by the gates in FF1 may be indeterminate quantities. However, these problems may be resolved somewhat inasmuch as the timing pulse TPB is designated as a high level signal at time period $t1$. Therefore, the output of gate 222 must be a low level signal at $t1$. However, this causes the application of a low level input signal to gate 216. The output of gate 216 is then dependent upon the other input signals applied to the gate. This is, if the other input signal applied to gate 216 is a high level signal, the output signal of the gate will be a low level signal. Conversely, if the other input signal is a low level signal, the output signal from gate 216 will be a high level signal. As may be easily seen, the other input applied to gate 216 is, of course, the output of gate 214. This output signal is, moreover, determined by the input signals one of which has already been designated as a low level signal from filter 208. Consequently, if the other input signal to gate 214 (the output signal from gate 216) is a low level signal the output of gate 214 will be a high level signal and, conversely, it will be a low level output signal if the other input to gate 214 is a high level signal.

Thus, in the initial operation of the circuit, where initial operation is defined as meaning the operation of the circuit before steady state operation exists, the condition of the flip-flops and, thus, of the component gates is determined by the operating characteristics of the elements of each of the gates. In other words, if one gate inherently has a longer delay time or a different operating characteristic, for example in the transistor, one of the gates will assume the high output signal producing condition and the other gate will assume the low output signal producing condition. More particularly, one of the gates, under the circumstances described, will produce a low level output signal and the other gate will produce a high level output signal.

The timing diagram of FIGURE 3 includes the spurious pulse 300 which may be produced during the transient or warm-up period which the circuit must undergo when it is initially operated. This operation is designated by a solid line. The circuit operation designated by a dashed line is that operation wherein the spurious pulse is not produced. The production or not of the spurious pulse is solely dependent upon the operation of the flip-flops shown in FIGURE 2. It is to be understood, of course, that the discussion supra relating to FF1, relates also identically to FF2 which comprises two different gates each of which operates similarly to the gates discussed above.

Of course, though the spurious pulse shown in FIGURE 3 at the output 222 is not desirable, it is an operational possibility of the circuit and in order to provide completeness, this undesirable condition is described. Also, the desirable operation, without the spurious pulse, is described for similar time periods. It should be recognized that the spurious pulse may be eliminated by a judicious selection of gates and component parts thereof. Moreover, it will become readily apparent that after the warm-up period (usually only a few clock periods), the circuit (including FF1 and FF2) will be unable to produce a spurious output signal.

More specifically, in FIGURE 3 the operation of each of the gates is shown by the waveforms at various time periods. Thus, during the time period $t1$, the timing pulses TPA, TPB and TPC, are all shown as high level signals. This latter signl indicates, also, that the timing pulse $\overline{TPC}$ is a low level signal. Therefore, it is clear that gates 212 and 222 which receive, as input signals, the timing pulses TPA and TPB, respectively, must produce low level output signals inasmuch as a high level input signal is applied thereto. However, gate 220 has applied thereto the low level timing pulse signal $\overline{TPC}$ and the output thereof is determined by the other input to the gate and will be discussed subsequently. Because of the initial condition of the switch 204, the signal at contact A is a high level signal and the signal at contact B is a low level signal. Thus, the filter 206 which is utilized to filter noise from the input signal and is incidentally designated to operate more quickly than any of the gates, passes the high level signal to the inverter gate 210. The inverter gate 210 which has only one input signal applied thereto, inverts the input signal and produces a low level output signal. This low level output signal from gate 210 is supplied to gate 212 which must produce a low level output signal inasmuch as the high level input signal TPA has been applied thereto. Conversely, the low level signal at contact B of switch 204 is passed by filter 208 to one input of gate 214.

The output signal produced by gate 214 is dependent upon the output signal produced by gate 216 as is described supra in conjunction with the description of the flip-flop operation. Moreover, the output signal produced by gate 216 is dependent upon the output signal produced by gates 222 and 214. As noted above, gate 222 produces a low level output signal. Consequently, an output signal from gate 216 is dependent upon the signal applied thereto from the output of gate 214. For purposes of example, it is initially assumed that gate 214 provides a low level output signal whereby FF1 is in the set condition. The application of two low level input signals to gate 216 causes this gate to provide a high level output signal which is applied to one input of gate 214. The operation of the high level signal to gate 214 causes this gate to provide a low level output signal which is again applied to gate 216. Thus, it will be seen that this gate pair or flip-flop circuit is self sustaining in the set condition.

The output of gate 214 is also applied to an input of gate 212. As noted supra, gate 212 produces a low level output signal inasmuch as a high level input signal (TPA) is applied thereto. This low level output signal, in conjunction with the low level signal produced by gate 220 due to a high level input signal ($\overline{TPC}$), causes gate 218 to produce a high level output signal. The high level output signal from gate 218 is applied to one input of gate 220 such that gate 220 produces a low level output signal which is supplied to an input of gate 218 whereby the operation of FF2 is sustained in the reset condition. Likewise, gate 222 produces a low level output signal in response to the high level input signals applied thereto. It will be noted, that the signals produced by the several gates at time period $t1$ is somewhat dependent upon the assumptions made with the operating conditions of the flip-flop circuits.

Continuing to time period $t2$, it is seen that TPA becomes a low level signal while TPB and TPC remain high level signals. Thus, the signals provided to the inputs of gate 212, are a low level signal TPA, a low level signal of gate 210, and a low level signal of the gate 214 of FF1. Since the gate 212 has applied thereto all low level input signals, the output signal therefrom must be a high level signal. The application of the high level signal to one input of gate 218 causes this gate to provide a low level output signal which is supplied to gate 220 in combination with the low level signal $\overline{TPC}$ whereby the output signal from gate 220 is a high level signal which is supplied to gate 218. The operation of FF2 is, thus, shifted to the set condition and is self sustaining. The low level output of gate 218 is applied to an input of gate 222 in addition to the high level input signal TPB. Gate 222 continues to supply the low level output signal because of the high level input signal. The output signal is applied to output terminal 224 and to an input of gate 216. Since the inputs to gates 214 and 216 have not changed, these gates continue to supply the same output signals shown in time period *t*1.

At time period *t*3, the timing signal TPA is again a high level signal and all of the signals applied or supplied by or to various gates in the circuit are similar to those shown at time period *t*1.

At time period *t*4 timing pulse TPB supplies a low level signal to an input of gate 222. This signal is supplied concurrently with the low level signal supplied by gate 218 of FF2. Thus, gate 222 produces a high level output signal 300 (see FIGURE 3). Signal 300 is a spurious pulse, as will be shown subsequently and is also supplied to an input of gate 216. The application of the high level signal to the gate 216 causes this gate to produce a low level output signal which is applied to an input of gate 214. The low level signal is supplied in coincidence with a low level signal supplied by switch 204 via filter 208 such that gate 214 produces a high level output signal. This high level output signal is applied to gate 216 which, therefore, produces a low level signal for gate 214 and thereby sustains FF1 in the reset condition. The high level output signal from gate 214 is also applied to the input of gate 212 whereby gate 212 continues to produce a low level output signal as it has since TPA became a high level signal at time period *t*3.

At time period *t*5, the timing pulse TPB again assumes the high level and all of the other signals supplied or applied by or to the gates in the circuit continue at the same level as shown in time period *t*4 with the exception of the output signal at gate 222 which now becomes a low level signal inasmuch as the high level signal TPB is supplied to an input of the gate.

At time period *t*6, the timing pulse TPC becomes a low level signal whereby the timing pulse signal $\overline{TPC}$ becomes a high level signal. This high level signal is applied to one input of gate 220 whereby this gate produces a low level output signal. The low level signal from gate 220 is applied to gate 218 concurrently with a low level signal produced by gate 212 (because of the high level timing pulse signal TPA and the high level signal produced by gate 214). Consequently, FF2 is now operating in the reset condition and is controlled by the timing pulse signal $\overline{TPC}$. At time period *t*7, timing pulse TPC (and $\overline{TPC}$) returns to the original condition thereof. It will be seen that the other signals throughout the circuit at time period *t*7 are similar to those shown at time period *t*6.

It should be understood that the initial operating conditions assumed for the flip-flop circuits are not limited to those described supra. That is, the situation might exist where FF1 (gates 214 and 216) follows the solid line waveform designation of FIGURE 3 and FF2 (gates 218 and 220) follows the dashed line waveform designation of FIGURE 3. Of course, the opposite conditions are also possible. However, it may be shown (though it is not necessary in the instant description) that for the timing pulse arrangement shown, any spurious pulse will be produced in the same time period as spurious pulse 300. The operation provided by the opposite initial conditions is suggested by the broken lines 302 and 304 which indicate the waveforms of gates 218 and 220 (FF2) under these operating conditions. Moreover, the network again settles down after the transient period during which the spurious pulse is produced and the circuit becomes completely stable.

The above description of the circuit operating from time periods *t*1 to *t*7 may be considered to be the initial warm-up period during which the circuit has gone through the various transient stages of operation and thereafter will settle down to operate as expected. The spurious pulse 300 produced at time period *t*4 is shown for completeness and may be obtained only if either one of the flip-flops (FF1 or FF2) initially does not assume the stable condition. To recount the operation of this circuit during time periods *t*1 through *t*7 wherein different operating conditions of the flip-flops are initially assumed, the dashed lines are shown wherein a spurious pulse 300 is not produced. Thus, it would be necessary to assume that gate 214 initially provides a high level output signal which would be applied to an input of gate 212 as well as gate 216. Thus, it would be impossible for gate 212 to produce a high level output signal at time period *t*2. Similarly, gate 216 would continuously produce a low level signal in response to the help level signal applied by gate 214. On the other hand, it would be required that gate 220 initially supply a low level output signal to one input of gate 218 in conjunction with a low level output signal supplied by gate 212 to another input of gate 218. Thus, gate 218 would provide a high level output signal which would render the output signal from gate 222 a low level signal at all times. It should be clear that the spurious pulse 300 is not a defect in the circuit operation but is rather a product of a transient during a warm-up period which transient may actually be eliminated by proper or judicious choice of components for the several gate circuits of the flip-flops. More practically, another input may be added to the flip-flops to control the operation thereof. Such an additional input might be called "General Clear" or the like. The logical operation of this input is conventional in the art and need not be described here.

As suggested by the waveforms of FIGURE 3, the separate operation after the initial warm-up or transient period is identical regardless of whether or not the spurious pulse 300 was, in fact, produced. Thus, at time period *t*8 the signal TPA is applied to an input of gate 212. However, a high level input signal supplied by gate 214 maintains gate 212 in the low level output producing state. The low level output signal from gate 212 is supplied to gate 218 in coincidence with the low level signal supplied by gate 220 of FF2. Thus, gate 218 continues to supply a high level output signal which is applied to gate 222 such that gate 222 continues the low level signal at output terminal 224 and at an input of gate 216.

It will be seen that no changes in the signal levels occur thereafter (except the TP signals) until the armature of switch 204 is removed from contact A during time period *t*11. It will be assumed that the electrical disconnection between contact A and the armature of switch 204 is a clean break wherein noise, or arcing, or the like may be ignored. Furthermore, it will be assumed that the circuit operation, especially the repetition rate of the clock pulses or timing pulses, is much more rapid than is the operation of the switch 204. This is shown as the elapsed transfer time which is indicated on the figure. The changes in the waveforms which occurred because of the alteration of the switch position are shown in time period *t*11. More specifically, the removal of the high level signal from contact A effectively produces a low level signal which is applied to the input of gate 210. Inverting gate 210 will then produce a high level output signal which will be applied to an input of gate 212. Inasmuch as gate 212 is already producing a low level output signal (a high level TPA signal and a high level signal from gate 214 are applied) no change is effected throughout the rest of the circuit because of the disconnection between contact A and the armature of switch 204.

At time periods *t*12 and *t*14 the timing pulses $\overline{TPC}$ and TPA, respectively, cause no changes in the waveforms inasmuch as the gates affected by these pulses are controlled by other signals or are already in the proper operating condition. At time period *t*16, the timing pulse TPB has no effect for similar reasons.

The next operational consideration which takes place is that the armature of switch 204 begins to make connection with contact B of switch 204. The initial connection begins some time during time period *t*15. Inasmuch as there may be considerable bounce between the contact and the armature, a series of pulses are indicated. It will be seen that the signal at contact B varies between a low level and a high level signal in accordance with the actual connection between armature of switch 204 and contact B. The high level signal applies when the armature is connected to the contact and the low level signal applies when there is no connection. The number of bounces shown is merely an illustrative showing and is not meant to limit the circuit to a switch which operates with the indicated number of bounces but rather is effective to operate with a switch which has a larger or smaller number of bounces at the contact. Furthermore, the suggested length of bounce time is not limitative of the invention but rather is shown merely to be illustrative. Fewer bounces would be less realistic and less informative, and more bounces would merely render the showing of FIGURE 3 more tedious as well as more time and space consuming. For purposes of convenience, the extremes are suggested in the dashed outline on the waveforms suggested by gates 214 and 216. Thus for example, if it is assumed that the initial contact between the armature of switch 204 and contact B is an effective contact with no bounce, the leading edge of the dashed line represents the changing of the output pulse produced by gate 214 during time period *t*15. If on the other hand, actual connection between contact B and the armature of switch 204 such as to be effective to switch gate 214 is not established until the bouncing is completed, the switching of gate 214 from the high to the low level output producing state is shown at the trailing edge of the dashed line during time period *t*17. The solid diagonal or sloped line is shown to indicate the somewhat indeterminative operation which takes place during the bounce time. It is to be understood that the solid line shown, though basically used as a connecting line, is also suggestive of the operation of the circuit during these times. Thus, the contact source either on "make" or "break" is of little significance, especially if the filter recovers in less than the transfer time of the contact as specified supra.

The output of gate 214 is applied to inputs of gates 212 and 216. Inasmuch as the timing pulse TPA and the output of gate 210 applied to gate 212 are high signals at the time indicated, gate 212 will produce no output change. An output change at gate 216 will, of course, follow the output change of the gate 214. Therefore, a similar designation is shown in the gate 216 output waveform in FIGURE 3. That is, the leading edge of the dashed-line waveform of gate 216 is produced if the leading edge of the dashed-line waveform is produced by gate 214. Similarly, the trailing edge of the dashed-line waveform of gate 216 is produced if the trailing edge of the dashed-line waveform of gate 214 is produced. Consequently, the signals which exist at the leading edge of time period *t*18 (but not within this time period) TPA, TPB and TPC are all high level signals. The signal at contact A is a low level signal and the signal at contact B is a high level signal. The outputs of gates 210, 216 and 218 are all high level signals. The outputs of gates 214, 212, 220 and 222 are all low level signals.

At time period *t*18, the timing pulse $\overline{TPC}$ becomes a high level signal which would cause gate 220 to supply a low level output signal. Inasmuch as this condition already exists no change is made throughout the circuit. Similarly, during time period *t*20 the low level pulse TPA is supplied to gate 212 while a high level input signal is supplied thereto by gate 210 whereby no change may be rendered in the operative gate 212. At time period *t*22 a low level TPB signal is applied to gate 222. However, gate 218 is applying a high level input signal thereto whereby gate 222 continues to supply a low level output signal. At time periods *t*24, *t*26 and *t*28, conditions apply which have been previously discussed during time periods *t*18, 20 and 22, respectively.

During time period *t*29, the signal at contact B shifts from a high level to a low level signal. That is, the armature of switch 204 is removed from contact B. Again, it is assumed that there is no arcing or other deleterious operation during this disconnection of the circuit. The alteration of switch 204 during time period *t*29 has no significance, insofar as the operation of the circuit is concerned. That is, the duration of the time during which the armature of gate 204 and contact B are connected is merely illustrative and is not meant to be limitative of the invention. A shorter time length would be less than conclusive (for descriptive purposes) and a longer duration would be merely an elongation of the description of the operation of the circuit. The operation of switch 204 results in changing the signal from the high level to the low level during time period *t*29. For this description, it is assumed that switch 204 is not activated again whereby the signal at contact B will remain a low level signal to the end of the operation.

At time periods *t*30 and *t*31, timing pulses $\overline{TPC}$ and TPA, respectively, cause no operational changes in the gates to which the signals are applied. Subsequently, at time period *t*33, the transfer time between the disconnection of the armature contact B and the contacting of the armaure and contact A is culminated. Again, as was the case previously, it is assumed that there is a period of bounce or improper contact between the armature of the switch and contact A. This bounce time extends from time period *t*33 through time period *t*35. Again, the number of bounces indicated is not critical to the circuit operation. It has been noted, that during the switching operation of the armature from contact B (as was the case in the initial switching of contact A to contact B), each of the timing pulses appears at least once without producing any change in the waveform circuit.

The output of gate 210 is shown as having an indeterminate portion similar to that previously described for gates 214 and 216. That is, since it is somewhat indeterminate as to when the actual connection will be made between the armature of switch 204 and contact A, it is somewhat indefinite as to the precise time when the output of gate 210 will switch from a high level to a low level signal in response to the change in the input signal applied thereto. At the leading edge of time period *t*36, a substantially steady state operation exists which steady state operation shows timing pulses TPA, TPB and TPC as high level signals. The signal at contact A is a high level signal and the signal at contact B is a low level signal. Gates 210, 212, 214, 220 and 222 produce low level output signals. Gates 216 and 218 produce high level output signals. At time period *t*38, a low level TPA signal is supplied to gate 212. This signal is supplied concurrently with a low level signal from gate 210 and a low level signal from gate 214 of FF1. Thus, gate 212 will produce a high level output signal at time period *t*38. The high level signal produced by gate 212 is applied to an input of gate 218 whereby gate 218 produces a low level output signal. The low level output signal from gate 218 is applied to an input of gate 220. The low level signal $\overline{TPC}$ and the low level signal supplied by gate 218 cause gate 220 to produce a high level output signal. This high level signal is reapplied to an input of gate 218 to continue the production of a low level output signal whereby FF2 is maintained in the set condition. Moreover, inasmuch as the low level signal is applied to an input of gate 222 coincidentally with a high level TPB signal, the output from gate 222 is a low level signal at time period *t*38. This low level output signal is supplied to an input of gate 216 as well as output terminal 224. Inasmuch as the output signal produced by gate 214 is a low level signal, gate 216 produces a high level output signal which is applied to an input of gate 214 whereby FF1 is maintained in the reset condition.

At time period *t*39, the high level TPB signal assures that gate 222 will produce a low level output signal. At time period *t*40 the TPB pulse is a low level signal and it is applied to an input of gate 222 in conjunction with the low level signal produced by gate 218. The application of all low level signals to gate 222 effectively causes the production of a high level output signal from this gate. Clearly, this output signal is synchronized with the timing pulse TPB. As will become apparent, the output signal is in the form of a single pulse which exists for one pulse time only.

The high level output pulse signal is supplied to output terminal 224 and to an input of gate 216 whereby gate 216 supplies a low level output signal. The low level output of gate 216 is applied to an input of gate 214 in conjunction with the low level signal supplied by contact B via filter 208 whereby gate 214 produces a high level output signal. The high level output signal is supplied to gate 212, which is already producing a low level output signal because of the high level pulse TPA, and to an input of gate 216 whereby gate 216 continues to produce a low level output signal such that FF1 is maintained in the reset condition.

At time period $t42$, timing pulse TPC goes low and, conversely, timing pulse $\overline{TPC}$ goes high whereby gate 220 produces a low level output signal. This low level output signal is supplied to gate 218 in coincidence with a low level signal from gate 212 such that gate 218 produces a high level output signal. This high level output signal is applied to an input of gate 222 as well as gate 220. Gate 220 produces a low level signal in response to the high level input signal whereby FF2 is maintained in the set condition. A low level output signal is continued by gate 222. This output signal was switched low at time period $t41$ inasmuch as timing pulse TPB switched to a high level signal. The signal produced by gate 222 is applied to gate 216 but is not sufficient to alter the operation of FF1. It will be seen, that the timing pulses TPA, TPB, TPC (or $\overline{TPC}$) during time periods $t44$, $t46$ and $t50$ are not effective to vary the operation of the circuit such as to produce an output signal at terminal 224.

It will be seen from the foregoing description, that after the initial warm-up period no pulses are produced at the output of gate 222 which is connected to the output terminal 224 unless the armature of gate 204 is switched from contact A to contact B and then back to contact A. This switching operation may be effected by a microswitch or a single-pole, double-throw switch, as suggested in the drawing, or any similar type of switching arrangement. The switching means must be capable of supplying the input gates thereby to alter the condition of FF1 when desired.

Basically, the circuit may be seen to provide a synchronizing operation. That is, the circuit operates to control the transmission or passage of an asynchronous or nonsynchronous input signal applied to the circuit until it arrives at the output terminal thereof. This signal control is provided by the timing pulses TPA and TPB which are applied to gates in the circuit. Once a signal has been transmitted through the line in accordance with timing pulses TPA and TPB, timing pulse $\overline{TPC}$ will operate to control the operating condition of FF2 whereby the transmitting of pulses through the circuit to the output terminal may be interrupted at least once during each clocking cycle. Consequently, it will be seen that an output pulse can only be generated after a complete switching operation and in response to the clocking signals. In particular, in the embodiment shown in FIGURE 2, an output signal can be supplied only during the application of a clocking signal TPB such that a single pulse is produced during this time period which is therefore synchronized with this signal. This single pulse may be used in any manner to effect the initiation of a similar circuit or the like, and to provide synchronization, between separate circuits which may be related. The exact utilization of the synchronized single pulse is not critical to this invention which may be used for any desirable purpose.

Referring now to FIGURE 4, there is shown, in block diagram form, another embodiment of the invention which provides a single pulse output signal. Again, this single pulse is synchronized with a timing signal. As was the case in the embodiment shown in FIGURE 2, any conventional potential source 400 capable of supplying a predetermined potential which is shown as +V volts, is connected to one terminal of current limiting resistor 402. Another terminal of resistor 402 is connected to the armature of single-pole double-throw switch 404. Switch 404 is similar to switch 204 of FIGURE 2 and may be considered to be a make-before-break type of switch. The type of switching arrangement is not crucial to the operation of the circuit. The suggested switch 404 has contact terminals A and B. These contacts or terminals are alternatively connected to the potential source 400 by armature 404. Contact terminal A is connected to one terminal of filter 406. Switch contact terminal B is connected to filter 408. Filters 406 and 408 are similar to the filters 206 and 208 previously described in reference to FIGURE 2.

The output of filter 406 is applied to the input of inverting gate 410. Inverting gate 410, as well as the other gates in the circuit, are similar to the gating circuit shown and described in FIGURE 1. The output of gate 410 is applied to one input of gate 412. Another input of gate 412 is supplied by gate 424 which will be discussed in detail subsequently. Another input to gate 412 is the timing pulse signal CP which may be any type of regularly occurring signal such as a clock pulse or the like. The source of this timing pulse signal may be any conventional circuit for supplying this type of signal. Another input to gate 412 is supplied by the output of feedback inverting gate 420 which will be described in detail subsequently.

The output of gate 412 is supplied to one input of gate 414. Gate 414 is one of the gates which are so interconnected to form a flip-flop, designated as FF3. The other input to gate 414 is supplied by the output of gate 416 which is the other gate in the flip-flop. The output of gate 414 is applied to one input of gate 416 whereby the flip-flop may be maintained in the set or reset condition. Another input of gate 416 is supplied by the output of gate 422 which supplies output signals to circuit output terminal 430.

The output of gate 414 is also applied to one terminal of a delay element 418. Delay element 418 may be any conventional type of delay element, as for example a transmission line, a co-axial cable, or the like. The type of delay line is not crucial so long as the duration of the delay period is greater than the duration of a timing pulse, CP, but not greater than the time period included between the leading edges of two consecutive clock pulses. That is, the delay time should not permit the overlapping of two timing pulses. The output of the delay element 418 is supplied to the input of the feedback inverting gate 420 which has the output thereof applied to gate 412 as described supra. This network has the effect of providing an inverting feedback path around the delay element such that an inverted signal may inhibit the gate 412 at certain clock pulse times.

In addition, the output from delay element 418 is applied to one input of gate 422. Another input to this gate is the timing pulse signal CP. The source of this timing pulse input signal may be identical with source of the timing pulse input supplied to gate 412. However, because of delay element 418, the CP signals at gates 412 and 422 are, in effect, operating on signals which differ in time. That is, a signal which is applied to gate 412 coincidentally with signal CP is not the same signal at gate 422 for the same CP. Rather, the operation of the CP signals on signals applied at the respective gates are, in effect, separated by the number of time periods represented by the delay element 418.

The output from gate 422 is applied to the output terminal 430. At the output terminal 430 there may be connected any of the desirable utilization circuits or networks which are to receive the output signal from the instant circuit. Also, the output from gate 422 is applied to the input of gate 416 which is the second gate in FF3 as described supra. Clearly, the output signal produced by gate 422 may be utilized to affect the operating condition of FF3. The output signal from gate 422 is also applied to an input of gate 426. Gate 426 comprises one of the gates in the flip-flop FF4. The output of gate 426 is applied to one input of gate 424. The other input of gate 424 is supplied by the filter element 408 as described supra. The output signal produced by gate 424, in response to the input signals supplied thereto, is supplied to the input of gate 426. Thus it will be seen that gates 424 and 426 are so interconnected that when the combination thereof (FF4) assumes one operating condition, i.e. set or reset, the network is self-sustaining in this condition. The output of gate 424 is also applied to one input of gate 412 as described supra and may be utilized to control the operation thereof.

The similarities between the circuit shown in FIGURES 2 and 4 should be obvious. For example, each circuit comprises two flip-flops which control the operation thereof. For example, each of these circuits has a flip-flop (FF1 and FF4 respectively) which controls the condition of a gate in the signal transmitting network. In addition, each circuit has a second flip-flop (FF2 and FF3 respectively) which receives an output from the aforementioned controlled gate whereupon this latter flip-flop is conditioned with regard to the operation thereof. The dissimilarities in the circuits become obvious inasmuch as the circuit of FIGURE 2 requires a system having at least three timing pulses whereas the system shown in FIGURE 4 requires only one clocking pulse source. That is, the system in FIGURE 4 utilizes a delay element and additional feedback circuitry to provide gating signals which function similarly to the additional clocking pulses supplied to the circuit shown in FIGURE 2. Thus, the clock pulse CP applied to gate 422 operates with a delayed signal produced by element 418 and is not, in effect, operably identical with the CP signal supplied to gate 412. Similarily, a delayed signal supplied by delay element 418 is supplied to gate 412 via inverting gate 420. In addition, instead of applying a separate clocking signal to FF3 thereby to alter the condition thereof, the delayed output signal produced by gate 422 is utilized. It will be seen that there are distinctions in circuit configuration between the circuits shown in FIGURES 2 and 4 but that the overall operation thereof is substantially similar.

Figure 5:
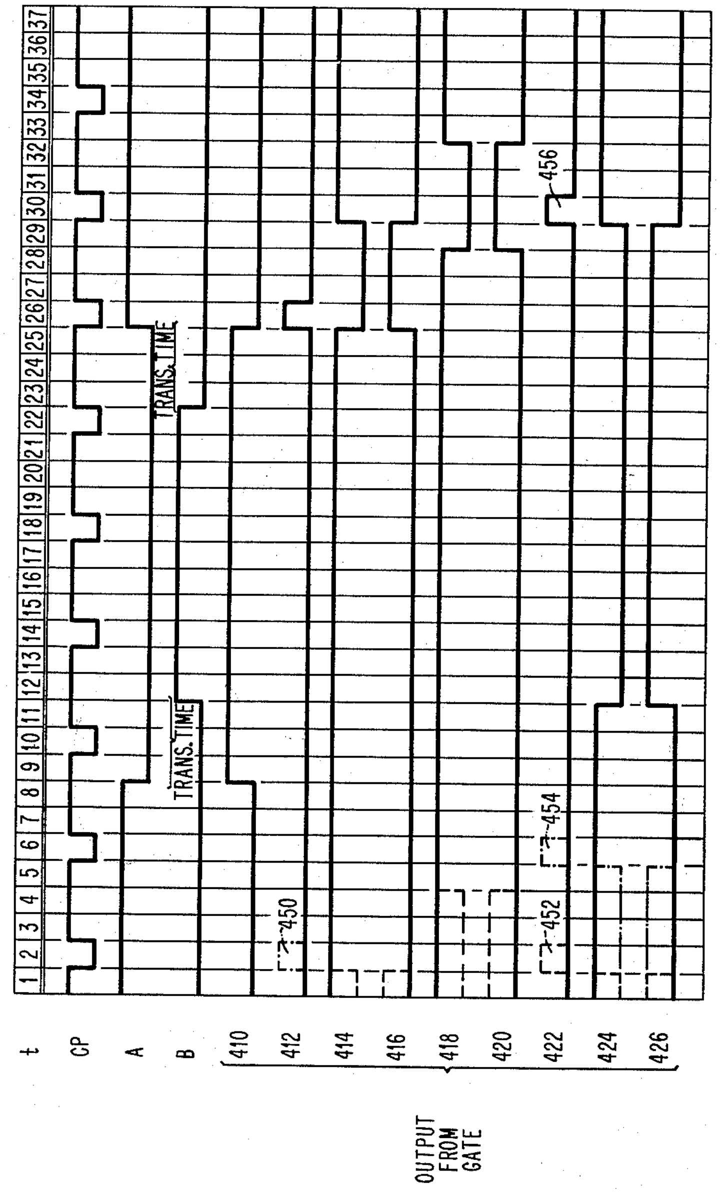
FIGURE 5 is a timing diagram for the circuit embodiment shown in FIGURE 4.

That the operation of the circuit shown in FIGURE 4 is similar to the operation of the circuit shown in FIGURE 2 may be more easily shown by discussing the operation of the circuit shown in FIGURE 4 with reference to the timing diagram shown in FIGURE 5. In FIGURE 5, the timing pulse signals have only one phase and are designated as CP to suggest a clock pulse and to avoid confusion with the three-phase timing pulses applied to the circuit shown in FIGURE 2. It will be seen that the timing pulses CP are regularly recurring signals which may be applied by any conventional source. The signal designated as A represents the signal at the contact A of switch 404. This signal is arbitrarily designated as being a high level signal at time periods *t*1 through *t*8. The signal at contact A is indicative of the fact that the potential source 400 of FIGURE 4 is, for purposes of example only, a positive potential source and provides a high level signal when the armature of switch 404 is connected with contact A of the switch.

As suggested supra, the signal applied at contact A changes to a low level signal at time period *t*9 and remains as such until time period *t*25. At time period *t*26, the signal at contact A switches to the high level and remains as such throughout the remainder of the operation described.

The signal designated as B represents the signal at contact B of switch 404. Obviously, the signal at contact B will be the inverse of the signal at contact A with the exception of the period designated as "Transfer Time." The Transfer Time period, as previously described in the description of FIGURE 3, is the time required for the armature of switch 404 (or 204) to transfer from contact A to contact B, and vice versa. The Transfer Time period may, of course, be relatively larger or smaller in the particular scheme depending upon the repetition rate of the timing pulses, CP. The signal B is a low level signal from time period *t*1 through time period *t*1 through time period *t*11. At time period *t*12, the signal at contact B switches to the high level and remains as such until time period *t*22. At time period *t*23 the signal at contact B switches to the low level and remains as such during the remainder of the description of the circuit operation. The signal change is produced in accordance with the selective connection between the source 400 and contact B via the armature of switch 404.

The signal designated as the output signal from gate 410 is obviously the mere inverse of the signal applied at contact A of switch 404. That is, filter 406 is assumed to be a substantially ideal filter having fast response characteristics. Gate 410 is an inverting gate such that when the signal at contact A is a high level signal the signal at the output of gate 410 is a low level signal. Similarly, at time period *t*9 when the signal at contact A switches to a low level signal the output signal at gate 410 switches to a high level signal and remains as such until switch 404 is changed and the signal at contact A becomes a high level signal at time period *t*26. At that time, the output signal from gate 410 becomes a low level signal and remains as such until the end of the description of the operation. It will be seen that the operation of the circuit and relative speeds of the timing pulses and the switching signals is such that the switching signal encompasses or overlaps a plurality of timing pulses. This is normally the case in high speed computing machines or the like which are capable only of relatively slow operation.

The description of the signals CP, A, B and the output of gate 410 remains the same for the description of the operation of the circuit regardless of other assumptions which may be made about the initial circuit operation. Of course, the operation of the switch 404 may be the inverse of that shown whereby signals A, B and 410 would all be inverted.

The signals shown as outputs from gate 412 through gates 426 will vary somewhat in accordance with the initial operating conditions assumed. Thus, since the circuit includes flip-flops FF3 and FF4, different initial operating conditions may be assumed as noted supra. That is, in FF3 the output signal from gate 414 may be a high or a low level signal which in turn contributes to the conditioning of gate 416 to produce a low or a high level output signal, respectively and vice versa. Similarly, FF4 incorporates gates 424 and 426 each of which may produce a high or low level output signal in response to the input signals applied which output signals contribute to the conditions of the other associated gate in the flip-flop.

During the initial warm-up period (similar to that previously described in conjunction with the circuit shown in FIGURE 2) spurious output pulses may be produced. These spurious output pulses are designated as pulses 452 and 454 in FIGURE 5 and a spurious intermediate pulse designated as 450 may be produced by gate 412. These spurious pulses are produced only in accordance with certain initial condition assumptions which may be made. With certain other initial condition assumptions, it will be seen that no spurious pulses will be produced.

As suggested supra in the description of the operation of the circuit of FIGURE 2 a judicious choice of elements may be made such that the proper initial conditions are produced whereby spurious pulses are not produced or a "General Clear" signal may be applied to the flip-flops. In the alternative an initial warm-up period may be provided whereby spurious output signals will not cause any signals to be inserted into the utilization network connected to the output terminal 430. The operation of the circuit will be described both with and without the spurious pulses in order to provide completeness in the description. It is to be understood, of course, that the spurious pulses may be eliminated if so desired by any of the methods suggested supra or by any other suitable procedure.

In the operation of the circuit suggested by the solid line, initial operating conditions necessary for operation without the production of a spurious pulse will be described. Thus, the output of gate 414 in FF3 is initially assumed to be a high level output signal. This high level output signal is applied to one input of gate 416 whereby gate 416 produces a low level output signal. The low level output signal is applied to an input of gate 414 thereby sustaining the flip-flop in this operating condition so long as gate 412 produces a low level output signal. Similarly, gate 424 is initially assumed to produce a high level output signal which is applied to an input of gate 426 which must, therefore, provide a low level output signal regardless of the level of the input signal supplied by gate 422.

At time period $t1$, the output of gate 412 must be a low level signal, inasmuch as timing pulse C.P. is a high level signal. Consequently, low level input signals are supplied to gate 414 by gates 412 and 416 whereby gate 414 continues to produce a high level output signal. This output signal is applied to delay element 418. Since it was initially assumed that gate 414 produced a high level output signal it is also assumed that delay element 418 will also produce a high level output signal. The output produced by delay element 418 is applied to the input of inverting gate 420 whereby a low level signal is applied by gate 420 to an input of gate 412.

The output signal from gate 422 must also be a low level signal inasmuch as the timing pulse C.P. is a high level signal. Thus, a low level and a high level input signal are supplied to gate 426. Gate 426 must, therefore, produce a low level output signal which is supplied to an input of gate 424 whereby FF4 is maintained in the initial operating condition.

At time period $t2$ timing pulse CP becomes a low level signal. However, gate 412 has applied thereto the high level signal produced by gate 424. Thus gate 412 must continue to produce a low level output signal. Inasmuch as no change is made in the inputs to gate 414 or 416, FF3 remains similar. Likewise, the output of delay element 418 continues as noted. Consequently, a high level input signal is applied to gate 422 whereby this latter gate must continue to produce a low level output signal. It will be seen that the signals applied to the inputs of gates 424 and 426 are continuous whereby FF4 remains unchanged and produces the output signals shown by the solid line. The operation of the circuit during time periods $t3$, $t4$ and $t5$ is similar to the operation of the circuit at time period $t1$. At time period $t6$ another low level timing pulse C.P. is supplied to the circuit. However, as is obvious, no changes have been made in any of the other signals whereby the circuit operation described for time period $t2$ applies.

At time period $t9$ it will be seen that the signal at contact A of switch 404 switches from the high level to the low level since the armature of the switch has been removed from contact A. Accordingly, the output signal of inverting gate 410 switches to a high level signal. However, as shown, no other changes take place throughout the remainder of the circuit.

At time period $t10$ timing pulse C.P. becomes a low level signal again. However, inasmuch as high level signals are applied to gates 412 and 422 by other inputs, these gates continue to produce low level signals.

There are no changes in the output signals produced by the gates until time period $t12$ when the armature of switch 404 and contact B of the switch are connected. At this time the signal at contact B becomes a high level signal which is fed via filter 408 to an input of gate 424. This high level input signal causes gate 424 to produce a low level output signal instead of the previous high level signal. The low level output signal from gate 424 is applied to gate 426 in conjunction with the low level input signal supplied by gate 422. Thus, gate 426 produces a high level signal which is applied to gate 424 whereby FF4 remains in the condition shown. The circuit continues to operate as shown between time periods $t12$ and $t22$ especially since the high level signal produced by gate 410 is effective to inhibit the operation of the C.P. signal at gate 412. At time period $t22$ the connection between the armature and contact B of switch 404 is broken. Thus, the signal at contact B switches to the low level. However, no change is made throughout the circuit inasmuch as the flip-flops are self-sustaining and continue operating in the conditions shown. At time period $t26$, the connection is made between contact A and the armature of switch 404. This connection causes inverter gate 410 to produce a low level output signal. The low level signal produced by gate 410 is supplied to an input of gate 412. Simultaneously in this example, timing pulse C.P. produces a low level signal as do gates 420 and 424. Inasmuch as all of the input signals applied to gate 412 are low level signals, gate 412 produces a high level signal. This high level signal causes gate 414 to produce a low level output signal which is supplied to gate 416. The input signals to gate 416 are low level signals supplied by gates 414 and 422; thus, gate 416 produces a high level output signal which is supplied to an input of gate 414 such that FF3 remains in the condition shown. The low level signal produced by gate 414 is applied to delay element 418 but does not reach the inputs of inverting gate 420 and gate 422 until a later time period, viz. after time period $t28$. At time period $t29$, the output signal produced by delay element 418 follows the output signal produced by gate 414 and drops to the low level. Similarly, the output of inverting gate 420 rises to the high level.

At time period $t30$, timing pulse CP becomes a low level signal. However, there is no change made in the output of gate 412 inasmuch as the output of gate 420 is a high level signal and is applied as an input to gate 412.

Referring to gate 422, it is noted that the low level signal produced by delay element 418 (the delayed output signal of gate 414) is applied to gate 422. Inasmuch as the input signals applied to gate 422 (timing pulse CP and the output signal from delay element 418) are low level signals this gate produces a high level output signal. The high level output signal produced by gate 422 at time period $t30$ is applied to an input of gate 416 and an input of gate 426. This high level signal causes these latter named gates to produce low level output signals. The low level output signals produced by these gates are applied to the inputs of gates 414 and 424, respectively. Thus it will be seen that FF3 and FF4 are caused to change conditions as shown in the drawing. The pulse 456 shown at time period $t30$ is the single pulse which is produced by the operation of switch 404. This pulse has a duration identical to the timing pulse CP and is comprised of a single pulse regardless of the length of time required to move switch 404 from contact A to contact B and back to contact A.

That a single pulse is produced may be seen by noting the operation at time period $t34$ wherein the timing pulse CP becomes a low level signal again. It will be seen that gate 424 produces a high level signal whereby gate 412 must produce a low level signal. This low level signal is applied to gate 414 in conjunction with a low level signal from gate 416. Thus, gate 414 will continue to produce a high level output signal. This high level output signal is transferred via delay element 418 and continues to be present at time period $t34$ such that a high level signal is applied at an input of gate 422 at this time. Thus, in spite of the low level CP signal, gate 422 must produce a low level output signal. This low level output signal is applied to inputs of gates 416 and 426 to continue the operation thereof as shown in FIGURE 5.

It is to be understood, of course, that there may possibly be variations of the initial operating conditions of the flip-flops of the circuit shown in FIGURE 4. The description of the circuit operation has been given for a set of initial operating conditions which will produce an output signal but not produce a spurious signal during the initial operating or warm-up period. This preferred operation has been designated by the solid line in FIGURE 5.

Another set of assumptions for the initial operating conditions are suggested by the dashed lines shown in FIGURE 5. Thus, in this condition the initial operating condition is so chosen that gate 414 of FF3 initially produces a low level output signal. Consequently, gate 416 initially produces a high level signal. Likewise, delay element 418 is initially assumed to produce a low level signal which corresponds to the low level signal at gate 414. Obviously, the signal produced by delay element 418 extends beyond the end of the low level signal produced at gate 414 by the duration of the delay time inserted by the delay element 418. Inverting gate 420, which inverts the output signal of delay element 418, produces a high level output signal. In addition, FF4 is assumed to have the gates thereof in the operating conditions suggested by the dashed lines. That is, gate 424 produces a low level signal and gate 426 produces a high level signal. It will be apparent, that these signal designations are opposite to the initial signal conditions assumed previously for the description of the operation of the circuit. Under these conditions, it will be seen that gate 412 must continue to produce a low level output signal even though gate 424 still produces a low level signal. This condition exists because gate 420 produces a high level output signal which is applied to an input of gate 412. It will be noted, furthermore, that at time period $t2$, a low level timing pulse, CP, is applied to gate 422 in conjunction with a low level output signal from delay element 418. Thus, gate 422 produces a high level output signal 452. Clearly, this output signal is a spurious pulse. However, it will be noted, that the spurious pulse 452 will function somewhat as a logical "Clear" signal inasmuch as the application of a high level pulse produced by gate 422 to the inputs of gates 426 and 416 will cause these gates to switch from the condition of producing a high level output signal to the condition wherein they produce low level output signals. Furthermore, inasmuch as gates 414 and 424 have applied thereto low level signals at the other inputs, the low level signals produced by gates 416 and 426 respectively will cause gates 414 and 424 to produce high level outputs whereby flip-flop circuits FF3 and FF4 will be sustained in the condition shown in FIGURE 5. It will be apparent that subsequent to time period $t3$ the signals shown in the dashed lines correspond to those shown by the solid lines with the exception of the signal produced by output delay element 418 and inverting gate 420. However, these signals also correspond to the solid line signals by time period $t5$ such that from time period $t5$ the circuit operations are identical. Only a spurious pulse 452 has been produced and this pulse may be avoided by any of the means suggested, supra, or it may be included into the overall circuit operation to function as a "General Clear" type of pulse. However, with this latter arrangement, it is obvious that the utilization circuits connected to output terminal 430 must be capable of ignoring this pulse through the use of other logic or the like.

Still another set of assumptions about the initial operating conditions of the circuit is suggested in FIGURE 5. In this operation, it will be assumed that gates 414 and 416 follow the solid line operating configuration while gates 424 and 426 follow the dash-dot configuration. Under these circumstances, it will be seen that the spurious output pulse 454 and the spurious intermediate pulse 450 will be produced. These pulses, as is the case of the spurious pulse 452, may be eliminated or avoided by proper circuitry if so desired. However, it will be seen that pulse 454 (effectively generated by pulse 450) functions similarly to spurious output pulse 452 inasmuch as production of this signal will alter the operating conditions of the gates of FF4 such that this flip-flop produces pulses or output signals which are identical to the solid line signals which have been previously discussed. The logical switching produced by signal 454 effectively alters the circuit and cancels or eliminates the possibility of future production of signals 450 as well as the possibility of further significance thereof. An output signal 456 will be produced under proper conditions after the spurious pulses are eliminated.

By a similar review of the circuit operation, it will be seen that gates 414 and 416 may follow the dashed line configuration while gates 424 and 426 follow the solid line configuration. It will be found that under these circumstances a spurious pulse is produced at the same logical location as the spurious pulse 452. A description of the production of this pulse is not deemed necessary inasmuch as the production of the spurious pulses and a means for avoiding or eliminating such pulses is similar throughout the description of the circuit.

Thus, there have been described two embodiments of a circuit which will produce a single-pulse output signal. This single-pulse output signal has a duration which is equivalent to a timing pulse signal duration and the pulse is synchronized therewith. Thus, any desirable utilization circuit may be connected to the circuit to receive a single pulse. This single pulse may be utilized to initiate the operation of a counter circuit or the like or merely to initiate the operation of another type of circuit. Since the utilization circuit is not a portion of the invention per se and any conventional circuit having these requirements need not be described in detail.

It is to be further noted that the circuits which are described utilize only semiconductor devices and do not utilize any mechanical type switching circuits. Thus, the problems associated therewith have been avoided.

In addition, it should be understood that the embodiments described are illustrative only and are not meant to be limitative of the invention. Other variations in the elements and components which comprise the invention are meant to be included within the scope of this description so long as the inventive concepts are observed. These inventive concepts are defined in the appended claims.

The embodiments of the invention in which an exclusive property or privilege is claimed are defined as follows:

1. A circuit for producing a single, synchronized output pulse comprising, input means,
- first gate means selectively connectable to said input means,
- second gate means connected to said first gate means and adapted to receive control signals from control signal supplying means,
- third gate means connected to said second gate means,
- fourth gate means connected to said third gate means and adapted to receive control signals from control signal supplying means,
- output means connected to said fourth gate means,
- fifth gate means selectively connectable to said input means, said second gate means connected to said fifth gate means to receive signals therefrom, sixth gate means connected to said fifth gate means at two circuit locations to form a bistable circuit, said fourth gate means connected to said sixth gate means to supply thereto the same signals as are supplied to said output means, and seventh gate means connected to said third gate means at two circuit locations to form a bistable circuit and adapted to receive control signals from control signal supplying means.

2. A circuit for producing a single, synchronized output pulse comprising, input means, first gate means selectively connectable to said input means, second gate means having an input thereof connected to the output of said first gate means and adapted to receive control signals, third gate means having an input thereof connected to the output of said second gate means, fourth gate means having an input thereof connected to the output of said third gate means and adapted to receive control signals, output means connected to the output of said fourth gate means, fifth gate means selectively connectable to said input means, said second gate means having a further input thereof connected to the output of said fifth gate means, sixth gate means having an input thereof connected to the output of said fifth gate means, said fifth gate means having an input thereof connected to the output of said sixth gate means, said fourth gate means having the output thereof connected to an input of said sixth gate means, and seventh gate means having an input thereof connected to the output of said third gate means, said third gate means having an input thereof connected to the output of said seventh gate means.

3. A circuit for producing a single, synchronized output pulse comprising, switchable input means, first gate means selectively connectable to said input means, second gate means connected to the output of said first gate means and adapted to receive control signals, third gate means connected to the output of said second gate means, fourth gate means connected to the output of said third gate means and adapted to receive control signals, output means connected to the output of said fourth gate means, fifth gate means selectively connectable to said input means, said second gate means connected to the output of said fifth gate means, sixth gate means connected to the output of said fifth gate means, said fifth gate means connected to the output of said sixth gate means, the output of said fourth gate means connected to said sixth gate means, and seventh gate means connected to the output of said third gate means and adapted to receive control signals, said third gate means connected to the output of said seventh gate.

4. The circuit of claim 3 including a plurality of means for supplying said control signals.

5. A circuit for producing a single, synchronized output pulse comprising, input means, first gate means selectively connectable to said input means, second gate means connected to said first gate means and adapted to receive control signals, third gate means connected to said second gate means, delay means, fourth gate means connected to said third gate means via said delay means and adapted to receive control signals, output means connected to said fourth gate means, fifth gate means connected to said input means, said second gate means connected to said fifth gate means, sixth gate means connected to said fifth gate means at two circuit locations, one of which is a common connection with said second gate means, said fifth and sixth gate means providing a bistable device, said fourth gate means connected to said sixth gate means in a common connection with said output means, seventh gate means connected to said third gate means at two circuit locations, one of which is a common connection with said delay means, said seventh gate means adapted to receive control signals, said third and seventh gate means providing a bistable device, and eighth gate means connected between said third and second gate means via said delay means.

6. A circuit for producing a single, synchronized output pulse comprising, input means, an inverting circuit selectively connectable to said input means, a first AND gate having an input thereof connected to said inverting circuit and adapted to receive control signals, an input of first flip-flop means connected to the output of said AND gate, a second AND gate connected to an output of said first flip-flop means and adapted to receive control signals, output means connected to the output of said second AND gate, an input of second flip-flop means selectively connectable to said input means, said first AND gate having another input thereof connected to an output of said second flip-flop means, and means connecting said output means to another input of said second flip-flop means.

7. A circuit for producing a single, synchronized output pulse comprising, input means, an inverting circuit selectively connectable to said input means, a first AND gate having a input thereof connected to said inverting circuit and a further input adapted to receive control signals, a first input of first flip-flop means connected to the output of said AND gate, a second input of said first flip-flop adapted to receive control signals, a second AND gate connected to an ouput of said first flip-flop means and adapted to receive control signals, output means connected to the output of said second AND gate, an input of a second flip-flop means selectively connectable to said input means, said first AND gate having another input thereof connected to an output of said second flip-flop means, and means connecting said output means to another input of said second flip-flop means.

8. The circuit of claim 7, including a plurality of control pulse sources each of which is connected to a separate circuit input.

9. A circuit for producing a single, synchronized output pulse comprising, input means, a first inverting circuit selectively connectable to said input means, a first AND gate having an input thereof connected to said first inverting circuit and adapted to receive control signals, an input of first flip-flop means connected to the output of said AND gate, delay means, a second AND gate connected to an output of said first flip-flop means via said delay means and adapted to receive control signals, output means connected to the output of said second AND gate, another input of said first flip-flop connected said output means, an input of a second flip-flop means selectively connectable to said input means, said first AND gate having another input thereof connected to an output of said second flip-flop means,
means connecting said output of said second AND gate to another input of said second flip-flop means,
and a second inverting circuit connected from the output of first flip-flop means via said delay means to the input of said first AND gate to recirculate delayed signals.

10. The circuit of claim 9 including a single source for supplying control signals.

11. The circuit recited in claim 6, including delay means which provide the connection between the output of said first flip-flop and said second AND gate, and inverting means connected between the output of said delay means and a further input at said first AND gate.

12. The circuit recited in claim 11, wherein said means connecting said output means to said another input of said second flip-flop means further connects said output means to another input of said first flip-flop means.

13. The circuit of claim 6 wherein said first flip-flop is adapted to receive control signals at another input thereof.

References Cited by the Examiner

UNITED STATES PATENTS

| | | | |
|---|---|---|---|
| 2,964,653 | 12/60 | Cagle et al. | 307—88.5 |
| 3,067,934 | 12/62 | Amacher et al. | 307—88.5 X |
| 3,124,705 | 3/64 | Gray | 307—88.5 |

ARTHUR GAUSS, *Primary Examiner.*